United States Patent [19]
Pugh

[11] 3,748,594
[45] July 24, 1973

[54] RADIO FREQUENCY ELECTRICALLY EXCITED FLOWING GAS LASER

[75] Inventor: Evan R. Pugh, Lexington, Mass.
[73] Assignee: Avco Corporation, Cincinnati, Ohio
[22] Filed: June 22, 1972
[21] Appl. No.: 266,512

Related U.S. Application Data
[63] Continuation of Ser. No. 881, Jan. 6, 1970.

[52] U.S. Cl. .................................. 331/94.5, 330/4.3
[51] Int. Cl. .......................... H01s 3/09, H01s 3/22
[58] Field of Search ..................... 331/94.5; 330/4.3

[56] References Cited
UNITED STATES PATENTS

| | | | |
|---|---|---|---|
| 3,302,127 | 1/1967 | Lin | 331/94.5 |
| 3,553,603 | 1/1971 | Leonard | 331/94.5 |
| 3,577,096 | 5/1971 | Bridges et al. | 331/94.5 |

OTHER PUBLICATIONS

Crocker et. al., Electronics Letters, Vol. 5, No. 4, 20 Feb. 1969, pp. 63–64. TR 7800 ES 93
Dumanchin et al., C. R. Acad. Sci. Paris, Vol. 269, 3 Nov. 1969, pp. 916B–1917B.
Hill, Applied Physics Letters, Vol. 12, No. 9, 1 May 1968 pp. 324–327.

*Primary Examiner*—Ronald L. Wibert
*Assistant Examiner*—R. J. Webster
*Attorney*—M. E. Frederick

[57] ABSTRACT

Apparatus for producing laser action in a flowing gas by electromagnetic energy at radio frequencies wherein the discharge circuit is capacitively ballasted by providing capacitive impedance between the electrode and the gas.

4 Claims, 3 Drawing Figures

EVAN R. PUGH
INVENTOR.

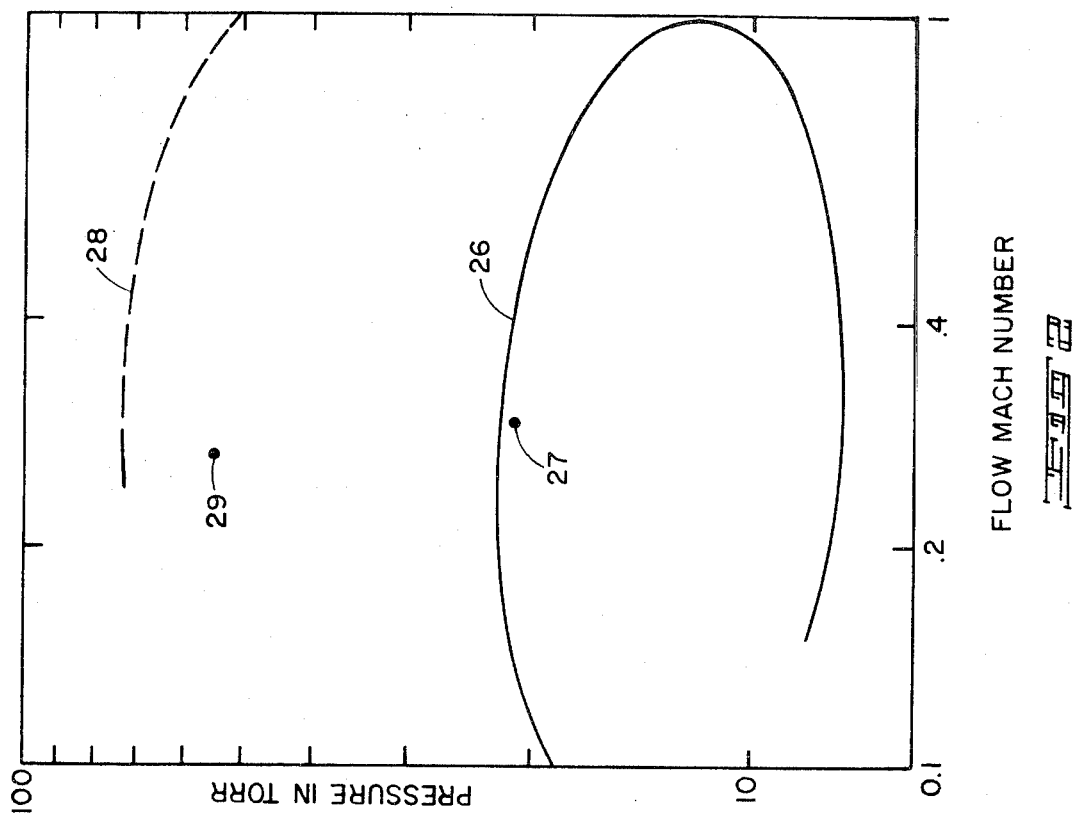
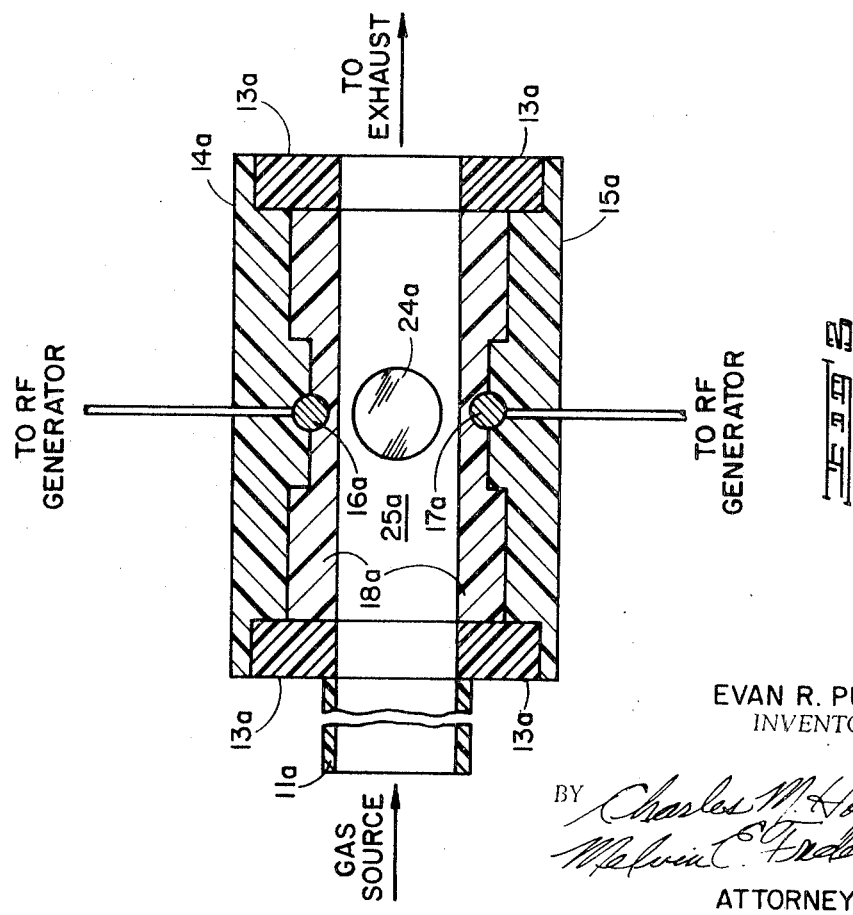

RADIO FREQUENCY ELECTRICALLY EXCITED FLOWING GAS LASER

This is a continuation of Ser. No. 881 filed Jan. 6, 1970.

The present invention relates to apparatus for the generation and amplification of light waves and more particularly to the generation and amplification of such waves by means of devices including flowing gaseous media in which stimulated emission of radiation is provided by electromagnetic energy at radio frequencies in combination with capacitive ballasting to create free electrons and maintain the optimum electron environment to produce lasing action.

Light amplification by stimulated emission of radiation (laser) has extended the range of controlled electromagnetic radiation to the infrared and visible light spectrum. A laser produces a beam of coherent electromagnetic radiation having a particular well-defined frequency in that region of the spectrum broadly described as optical. This range included the near ultraviolet, the visible and the infrared. The coherence of the beam is particularly important because it is that property which distinguishes laser radiation from ordinary optical beams. On account of its coherence a laser beam has remarkable properties which set it apart from ordinary light which is incoherent. While the maser (microwave amplification by stimulated emission of radiation) and the laser are based on the same principles of statistical and quantum mechanics, the problems and the physical embodiments for achieving laser action are completely different from those for masers.

Coherence, the essential property of lasers is of two kinds: spatial and temporal. A wave is spatially coherent over a time interval if there exists a surface over which the phase of the wave is the same (or is correlated) at all points. A wave is time-coherent at an infinitesimal area on a receiving surface if there exists a periodic relationship between its amplitude at any one instant and its amplitude at later instants of time. Perfect time coherence is an ideal since it implies perfect monochromaticity, something which is forbidden by the uncertainty principle.

Laser beams have a number of remarkable properties. Because of their spatial coherence, they have an extremely small divergence and are therefore highly directional. For example, a ruby laser beam one inch in diameter at the source will be about four feet across on a surface ten miles away. The very best that could be accomplished over the same distance with an incoherent source, such as an arc lamp at the focus of a six-foot parabolic mirror, would be a beam spread over an area more than one-third of a mile across. Another important feature of lasers is the enormous power that can be generated in a very narrow wave length range. Under certain operating conditions, monochromatic bursts of millions of watts can be produced. To get comparable radiation intensity from a black body, it would have to be raised to a temperature of hundreds of millions of degrees—a condition not practically achievable. A laser beam, because it possesses space coherence, can be focused to form a spot whose diameter is of the order of one wave length of the laser light itself. Enormous power densities are thus attainable. For example, the focused output of a 50-kilowatt infrared burst from a laser can have a radiant power density of the order of $10^{12}$ watts/cm$^2$; this is about 100 million times the power density at the surface of the sun. Extraordinarily high temperatures, orders of magnitude greater than that at the sun, can be generated at the small area which absorbs this concentrated radiation. Furthermore, since the electric field strength of an electromagnetic wave is proportional to the square root of its intensity, the field at the focus of the laser beam can be millions of volts per centimeter. The most promising potential of lasers comes from time coherence. It is this property which permitted prior art exploitation of radio and microwaves for communications. However, laser frequencies are millions of times higher than radio frequencies, and hence are capable of carrying up to millions of times more information. In fact, one single laser beam has in principle more information-carrying capacity than all the combined radio and microwave frequencies in use at the present time.

Accordingly, systems applications of lasers are useful for communication in space, on earth, and under sea. Military surveillance and weapons systems, mapping, medical, and computer technology may also include lasers.

Two conditions must be fullfilled in order to bring about laser action: (1) population inversion must be achieved and (2) an avalanche process of photon amplification must be established in a suitable cavity such as, for example, an optical cavity. Population inversion, can be accomplished if (1) the atomic system has at least three levels (one ground and at least two excited levels) which can be involved in the absorption and emission processes and (2) the spontaneous emission lifetime of one of the excited states is much longer than that of the other or others.

When a system is in a condition where light (photon) amplification is possible, laser action can be achieved by providing (1) means for stimulating photon emission from the long-lived state, and (2) means for causing photon amplification to build up to extremely high values. In the usual embodiment, this is accomplished by fashioning the medium containing the active atoms into a cylinder with perfectly (as far as possible) parallel ends polished so highly that the surface roughness is measured in terms of small fractions of a wave length of light. The ends are silvered or dielectric coated to behave as mirrors which reflect photons coming toward them from the interior of the cylinder. Such a structure, whether the mirrors are within or outside the container, is called an optical cavity. If now pumping means, such for example an intense source, acts on the medium and brings about population inversion of the long-lived state with respect to another lower energy excited state even though the long-lived state is only relatively long-lived, in a small fraction of a second there will be spontaneous emission of photons. Most of these photons will be lost to the medium but some of them will travel perpendicular to the ends and be reflected back and forth many times by the mirrors. As these photons traverse the active medium, they stimulate emission of photons from all atoms in the long-lived state which they encounter. In this way the degree of light amplification in the medium increases extraordinarily and because the photons produced by stimulated emission have the same direction and phase as those which stimulate them, the electromagnetic radiation field inside the cylinder or cavity is coherent. In order to extract a useful beam of this coherent light from the cavity, one (or both) of the mirrors is made slightly transmissive. A portion of the highly intense beam leaks through the mirror, and emerges with plane-parallel, regularly spaced wave fronts. This is the laser beam.

Parallelism of the mirrors is a rigorous geometrical requirement. If the mirrors are not precisely parallel, the light rays that build up in the cavity will tend to digress further and further toward the edges of the mirrors as they are reflected back and forth between the mirrors, and finally they will be directed out of the cavity altogether. It is essential that any deviation from parallelism be so small that the coherent photon streams will reflect back and forth a very large number of times to build up the required intensity for laser action. In a conventional well-made laser cavity the angle that one mirror makes with the other (called wedge angle) is about 2 seconds of arc. Satisfactory wedge angles may be achieved, for example, with micrometer adjustments. Use of spherical mirrors eases somewhat the rigorous requirements for keeping the still-amplifying beam in the cavity because spherical surfaces of the proper radius tend to reflect off-axis beams toward the center of the cavity. The laser radiation which emerges from a spherical mirror has spherical wave fronts and thus is divergent. However, since such coherent wave fronts appear to originate from a common center, they can be, by use of a lens, made plane-parallel and hence, except for diffraction effects, non-divergent.

By way of example, a continuously operating gas laser is disclosed in an article, "Population Inversion and Continuous Optical Maser Oscillation in a Gas Discharge Containing He-Ne Mixture," Physical Review Letter, 6, page 106, 1961. In the usual embodiment of static gas, prior art gas lasers, the gas is statically contained in a tube about 100 centimeters long. The mirrors which form the ends of the optical cavity are disposed either inside the tube or external to it. Pumping is accomplished in this system by electrical excitation (either radio frequency or direct current).

In addition to the helium-neon gas laser system, other gas laser systems have been achieved with helium, neon, argon, krypton, xenon, oxygen, and cesium (the last optically pumped in the gaseous state) as emitting atoms.

Other systems include carbon dioxide, helium, and nitrogen. For a more complete discussion of the high-power flowing system including carbon dioxide, helium, and nitrogen reference is made to patent application of C. K. N. Patel, Ser. No. 495,844, filed Oct. 14, 1965 and assigned to Bell Telephone Laboratories, Inc. Such a high-powered laser typically includes two reflectors forming a suitable resonator or cavity, a tube forming the side walls of the laser, suitable pumping apparatus including a cathode, anode and direct-current sources connected in appropriate polarity between the anode and the cathode; inlet apparatus; a source of carbon dioxide, helium, and nitrogen connected to the inlet apparatus; and equipment for exhausting the spent gases from the laser or for cooling and separating them for reuse.

As indicated hereinabove, a laser output may be generated in various media (i.e., crystals, semiconductors and gases) by pumping or introducing energy to create an inversion where a large number of the atoms are in high energy levels to support photon emission. In prior art gas lasers, whether flowing or static, the lasers were pumped or excited by using a diffusion controlled electrical discharge in a small tube maintained at a low pressure. Typically, in such gas discharge tubes (typically of the order of one centimeter in diameter) operating at low pressures (about 1-10 torr) there is a loss of electron-ion pairs from the center of the plasma to the sidewalls of the tube by radial diffusion (so-called ambipolar diffusion of ion-electron pairs). For a steady state operation of the discharge, this loss must be made up by net ionization rate in the plasma which exactly balances the diffusion loss rate. This required ionization rate dictates what temperature the electrons must have to sustain the discharge, and hence what applied E/N is needed to give the electrons that temperature. For long tubes E/N is defined by the applied voltage divided by the tube length and gas density.

In such situations the discharge can be said to be "ballasted" by the tube walls, i.e., since radial diffusion of the electron-ion pairs is fast, any small local increase in electron density is reduced by diffusion. This fact makes such discharges radially and axially uniform as well as quite reliable and simple to produce.

The plasma (neutral gas plus electron-ion pairs) contained inside the electric discharge tube tends to remain radially uniform as long as the time required for the electron-ion pairs to diffuse to the surrounding walls is equal to the ionization time such as, for example, the time required to double the electron density. Since the ambipolar diffusion time is generally proportional to the product of the gas pressure and the tube diameter squared for large diameters, this ambipolar diffusion time can, under some circumstances, become long compared to the ionization time in the tube, especially for high ionization rates, large diameter tubes and high pressures. In this latter situation, the discharge is no longer "ballasted" by the presence of the tube walls, i.e., local increases in the electron density are not immediately diffused to the walls where they are reduced by wall recombination, etc. Accordingly, local non-uniformities can be produced by these higher electron densities and the fast-growing non-uniformities can become worse. Often the result is that the previously uniform glow discharge turns into arcs, streamers or current spokes. This latter condition often is a plasma that is very inefficient, and often useless for certain purposes.

From the above it will be seen that in high-pressure, large diameter discharge tubes the tendency is for any local increase in electron density not to be damped by diffusion to the confining walls. Upon occurrence of such disturbances one can reduce their tendency to grow by reducing the ionization rate which means a lower electron temperature since the local ionization rate is a function of the local electron temperature. A lower electron temperature, however, requires that a lower electric field must be applied. The proper balance is a critical one; too high an electric field can allow the high pressure large diameter discharge to "spoke," but if too low an electric field is applied, the discharge cannot be started in the first place. Further, at high pressures, it is generally found that an applied voltage or electric field large enough to start a discharge is also large enough to cause the discharge to be radially non-uniform and, for example, "spoke."

The present invention is directed to the production of and apparatus for providing spatially uniform useful discharges in flowing gas lasers at gas pressures, velocities, and cavity sizes such that electron-ion pair diffusion to the confining walls is less than all other electron losses in the cavity such as, but not limited to, flow losses, recombination losses and attachment losses; in other words, the discharge is not wall dominated.

While the preferred embodiment of the present invention will be described in connection with a flowing electrically excited nitrogen ($N_2$) carbon dioxide ($CO_2$) and helium (He) laser it may be applied to other systems where such a plasma is required, including, but not restricted to, gas constituents other than nitrogen, carbon dioxide, and helium as well as other lasing systems. A discharge in accordance with the invention has the correct electron temperature for laser operation. Moreover, a laser in accordance with the invention is volumetric in the sense that the proper gas temperature and lower laser state concentrations are maintained not by diffusion through the gas to cooled sidewalls, but rather by the proper choice of gas flow velocity.

For a more complete discussion of a flowing gas laser wherein laser action is produced by electrical means including first means to create electrons and second means to maintain the optimum electrical environment to produce lasing action, reference is made to patent application Ser. No. 859,424, filed Sept. 19, 1969 by James P. Reilly and assigned to the same assignee as this patent application.

The following references and materials cited herein describe some of the background and physical principles involved in the present invention and an insight, to some degree, of the application of those principles in the present state of the art:

1. Von Engel: "Ionized Gases" Oxford University Press, London, 1955.
2. Bridges and Patel: "High Power Brewster Window Laser at 10.6 Microns," Appl. Phys. Lett. 7, 244 (1965).
3. Shapiro: "Dynamics and Thermodynamics of Compressible Fluid Flow," Vol. 1, Ronald Press, N.Y., 1953.
4. Engelhardt, Phelps and Risk: "Determination of Momentum Transfer and Inelastic Collision Cross Sections for Electrons in Nitrogen using Transport Coefficients," Phys. Rev. 135, No. 6A, Sept. 1964, p. A1566.
5. Phelps: "Rotational and Vibrational Excitation of Molecules by Low Energy Electrons," Westinghouse Research Laboratories, Scientific Paper 67-1E2-GASES-P2, 1967.
6. Cobine: "Gaseous Conductors," Dover Publications, N.Y., 1958.
7. Frost and Phelps: "Momentum-Transfer Cross-Sections for Slow Electrons in He, Ar, Kr and Xe from Transport Coefficients," Phys. Rev. Vol. 136, No. 6A, Dec. 1964.
8. Engelhardt, Phelps and Risk: "Determination of Momentum Transfer and Inelastic Collision Cross Sections for Electrons in $N_2$ using Transport Coefficients," Phys. Rev. Vol. 135, No. 6A, Sept. 1964.
9. Hake and Phelps: "Momentum-Transfer and Inelastic-Collision Cross Sections for Electrons in $O_2$, CO and $CO_2$," Phys. Rev. Vol. 158, No. 1, June 1969.
10. Cheo, "Effects of Gas Flow on Gain of 10.6 Micron $CO_2$ Laser Amplifiers," Journal of Quantum Electronics, Vol. QE-3, No. 12, Dec. 1967.
11. Guntherschulze, "Der Kathodenfall der Glimmentladung in Abhangigkeit von der Stromdichte Bei Spannungen Bis 3000 Volts," Zeit, f. Physik, 38, p. 575, 1956.
12. Schonhuber: "Breakdown Below $(Pd)_{min}$," Proceedings of the 7th Conference on Phenomena in Ionized Gases, Beograde, Jugoslavia, 1965, Beograd, Gradevinska Knjiga, 1966.

It is an object of the present invention to provide apparatus for producing a population inversion suitable for use in a gas laser oscillator or amplifier.

It is another object of the present invention to provide apparatus for producing laser action in a flowing gas by radio frequency electrical excitation.

A still further object of the invention is to provide apparatus for producing laser action in a flowing gas having a uniform discharge using radio frequency energy.

A still further object of the present invention is to provide apparatus for producing laser action in a flowing gas wherein radio frequency excitation is used to excite the gas and the flow parameters, flow velocity and gas density are used to control the gas discharge.

A still further object of the present invention is to provide apparatus for producing laser action in a flowing gas by capacitively ballasted radio frequency electrical excitation.

A still further object of the invention is to provide a radio frequency electrically excited flowing gas laser wherein the arrangement of the radio frequency excitation means comprises two plate electrodes covered with electrically nonconducting material.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 2 is a plot of gas pressure vs. gas flow speed showing by way of comparison, the region wherein a uniform discharge may be supported for apparatus in accordance with the invention having bare electrodes and electrically insulated electrodes; and FIG. 3 is a sectional end view of a modification of the invention.

Figure 1:
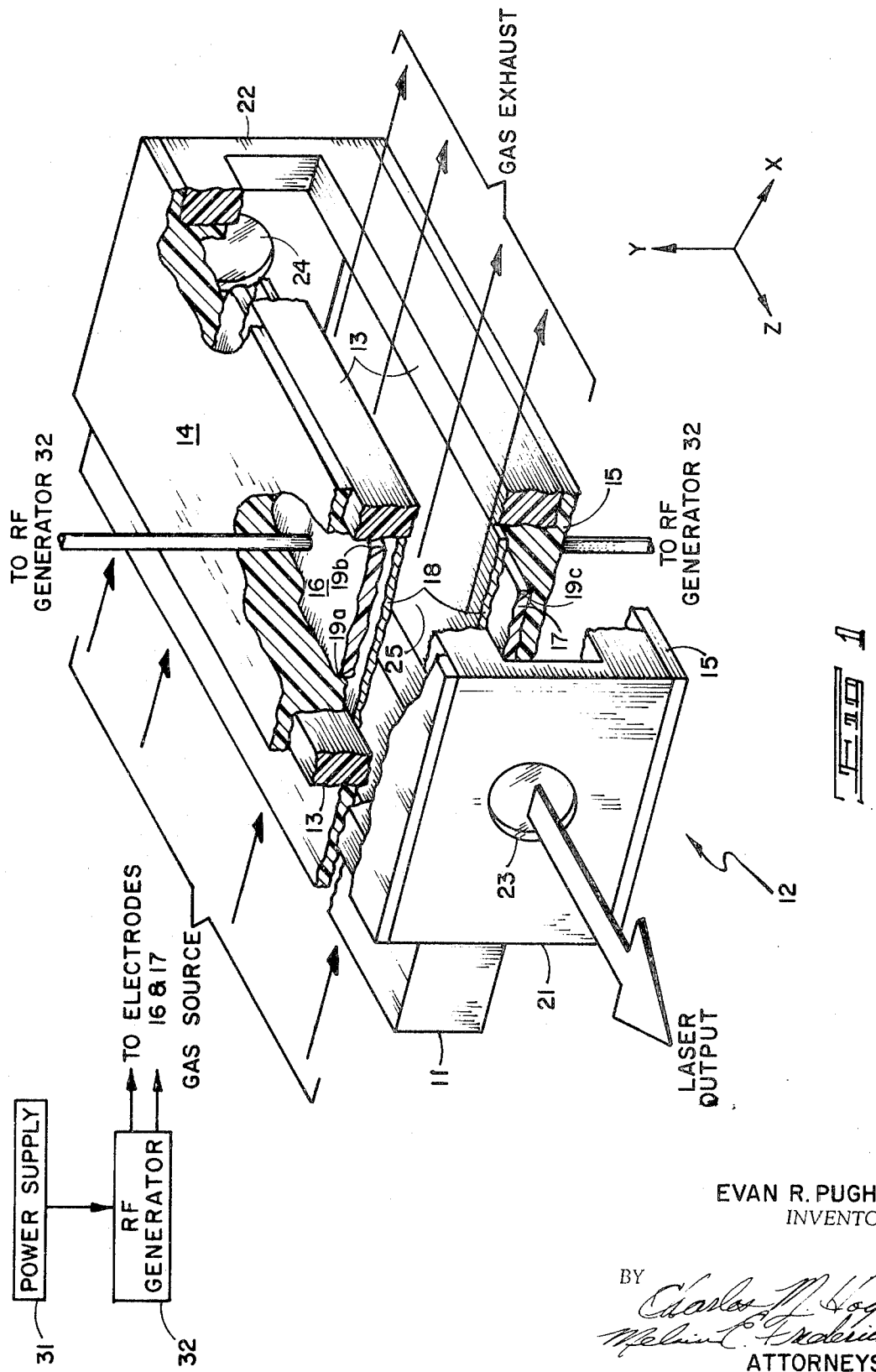
FIG. 1 is a perspective view with parts broken away of apparatus in accordance with the invention.

Attention is now directed to FIG. 1 which illustrates a preferred embodiment of the invention. A gaseous medium capable of producing lasing action such as, for example, a mixture comprising 16⅔ percent $CO_2$, 33⅓ percent $N_2$ and 50 percent He is supplied under pressure from a suitable source such as a plenum chamber and diffuser (not shown) to the working section of the laser via gas inlet means 11. The working section of a laser in accordance with the invention, generally designated by the numeral 12, may be generally rectangular in configuration and comprise a frame 13 for removably receiving oppositely disposed top and bottom sections 14 and 15 adapted to receive respectively plate electrodes 16 and 17. After the gaseous lasing media passes through the lasing device as shown in FIG. 1, it may be exhausted through a control valve or the like (not shown) for controlling pressure and into a vacuum system (not shown). The gaseous media may be recirculated and passed back through the system, if desired. Within the laser device 12, the active lasing cavity is preferably provided with a layer of nonablative dielectric material 18 permanently affixed to and covering the sections 14 and 15 and their electrodes 16 and 17. In accordance with the invention, the material 18 functions as a capacitive ballast and aids in maintaining a uniform discharge. The electrodes 16 and 17 which stimulate the gaseous media into lasing are preferably imbedded in the top and bottom sections 14 and 15. Disposed in the end walls 21 and 22 of frame 13 are respectively mirrors 23 and 24 which define, for the embodiment disclosed, an optical cavity or lasing region between the electrodes 16 and 17. Broadly, the active lasing cavity or region 25 comprises the region between mirrors 23 and 24 and within the E field created by the electrode geometry. The mirrors 23 and 24 may be of conventional configuration and type adequate to define a laser optical cavity as are well known in the prior art.

Excitation and inversion of the gaseous medium in the region 25 intermediate the electrodes 16 and 17 is provided by a radio frequency discharge of, for example, 27 megacycles. In order to continuously maintain optimum lasing conditions in the lasing region 25, a radio frequency discharge may be provided between the electrodes by means of, for example, a conventional power supply 31 and radio frequency generator 32 of conventional design.

The direction of laser output is perpendicular to the direction of flow of the gas and as indicated in drawing is in the Z direction, the direction of gas flow being in the X direction, and along the length of the longitudinal axis of the cavity. The optical cavity 25 is bounded by the electrodes 16 and 17 and the mirrors 23 and 24. In accordance with conventional practice, one of the mirrors such as, for example, mirror 24 is highly reflecting at the proper frequency and the other (mirror 23) is partially reflecting and partially transmissive to permit an output. As previously mentioned, the working gas passed through the working section in the X direction as shown. The gas may be supplied at a velocity of about Mach 0.25 for a pressure of about 80 torr. A suitable pump (not shown) may be provided and coupled with the outlet of the working section to provide the desired pressure.

As shown only by way of example in FIG. 1, the invention comprises broadly a flowing gas laser having a spatially uniform RF discharge created in the lasing region 25 wherein electron-ion diffusion to the walls in the flowing gas is negligible. It is to be understood that the present invention is useful with gases other than that described herein, a discharge to effect pumping being provided to produce the correct electron temperature for most efficient laser operation. Moreover, in a laser in accordance with the invention, proper gas temperature and lower laser state concentrations are maintained not by diffusion through the gas to cooled sidewalls, but rather, inter alia, by the proper choice of cavity size, gas flow velocity, and gas pressure.

FIG. 3 shows a modification of the invention. The means defining the cavity 25a are identical to that described in connection with FIG. 1 and an RF discharge is provided in the same manner as shown and described in connection with FIG. 1. However, as shown in FIG. 3, the electrodes 16a and 17a, while they also extend substantially the length of the longitudinal axis of the device, are of a rod-like configuration. Electrodes 16a and 17a are disposed in respectively the top and bottom portions 14a and 15a and covered with a dielectric material 18a as and for the purposes previously described. As pointed out above, even with capacitive ballasting an upper gas pressure exists above which spoking occurs. Removal of the sharp edges of the plate type electrodes as shown in FIG. 1 is helpful. Thus, to reduce the spoking problem at higher pressures, the surfaces 19a, 19b, and 19c (19d is not shown) of the electrodes adjacent the gas flow and defining the upstream and downstream portions of both of the plate type electrodes may be made smooth and to curve away from the gas flow as shown in FIG. 1. Alternately, rod-shaped electrodes 16a and 17a may be provided as shown in FIG. 3.

In an embodiment actually reduced to practice, the physical dimension of the lasing region 25 or positive column was approximately 20 cm in the lasing or Z direction, 2 cm in the flow or X direction, and 2 cm in the E field or Y direction. A suitable RF generator, such as the one actually used, may include a tetrode in a large coaxial plate tank circuit and powered by a small capacitive energy storage unit of, for example, 10,000 joules at 20KV. No difference need be expected in the lasing operation as between a pulsed supply or a CW supply. This is because a pulsed supply was turned on for many flow times without any adverse effects.

If desired, the pressure in the device may be controlled by means of a control valve or the like to provide pressures between 1 mm mercury to 1 atmosphere and the gas flow may be controlled within this range of pressures between Mach 1 and 0. In a device as shown and described hereinabove, with the exception that the electrodes 16 and 17 were exposed to the gas, with the input power fixed, the flow speed and pressure in the cavity were varied in order to determine the region of uniform discharge (delineated by the curve 26 in FIG. 2) which would produce efficient laser action. As may be seen in FIG. 2, this region was found to be a generally oval shaped area extending from less than about Mach 0.1 to Mach 1 in flow speed and from about 22 torr to 7.6 torr in pressure. As shown in FIG. 2, around the flow speed of Mach 1 only a very narrow range of pressures, about 12 torr, gave a uniform discharge. As the Mach number was lowered the range of operating pressures increased until the range was between Mach numbers of about 0.3 and 0.5 where the pressure could be varied between a limit of about 8 and 20 torr. As the pressure and Mach numbers were lowered further, the region closed again, due probably to excessive heating in the gas as the mass flow (a product of the pressure, and the Mach number) was lowered. The point of maximum efficiency identified by the numeral 27 for the bare electrode conditions is near the maximum available pressure for maintaining a uniform discharge which was approximately 22 torr at a Mach number of 0.3. This condition was found to provide an overall efficiency of about 3½ percent being approximately 115 watts of output power with an input power of about 3.2 kilowatts. The value of this efficiency is somewhat low, and reasons for its value will be discussed later when the power balance of the device is discussed.

During the aforementioned tests, it was noted that the discharge in the laser cavity became nonuniform due to spoking near the edges of the bare electrodes. As a result of this, the electrodes were covered to insulate them. This capacitively ballasted the device. Insulation of the electrodes may be accomplished by covering the electrodes with approximately 1/16 to ⅛ inches of a suitable dielectric material such as polystyrene or glass. It was found that capacitively ballasting the device in this manner permitted an increase in the pressure at which the laser could be operated with a uniform discharge over that possible with bare electrodes. The region of uniform discharge was increased from the maximum of 20 torr for the bare electrodes to approximately 80 torr for the insulated electrodes with optimum results being obtained at about 50 to 60 torr. The thickness of the dielectric 18 was varied and it was found that about 1/16 of an inch gave the best results. Further increasing the thickness had no effect except to raise the capacitive impedance in series with the gas discharge thereby merely making the gas in the laser more difficult to break down. With the capacitive ballasting the mass flow through the laser cavity was increased as delineated by the broken line 28 in FIG. 2. Some of the best results were obtained with input powers of around 5 kilowatts, an output power of 370 watts being obtained at a pressure of about 55 torr and a Mach number of approximately 0.25. The point of maximum efficiency is designated by the numeral 29 in FIG. 2. This provided an overall efficiency of 7 percent. With capacitive ballasting in accordance with the invention, spoking which occurred at pressures of approximately 80 mm and higher appeared to be uniform over the dielectric surface. While plate type electrodes have been shown, it is to be understood that other types such as cylindrical electrodes may be used. Cylindrical electrodes, for example, should improve the efficiency of the laser by allowing it to operate at higher pressures without spoking.

Calculations have been conducted in the form of a power balance for the two points 27 and 29 indicated on FIG. 2. These points give the best overall efficiency for the laser in the two electrode configuration, and occur at the maximum pressure that the device would operate at with a uniform discharge. The reason for this will be discussed in the following power balance shown in Table 1. Inspection of Table 1 will show that it does not fully account for the total power. This may be due to the fact that the electron temperature was not optimum, or that there are electrode losses which were not measured, and/or that the discharge occupied a considerably larger region than the region immediately between the electrodes 16 and 17. Even when all the identifiable losses are added to the power due to the laser action, in the bare electrode configuration only half the input power could be identified. However, in the capacitive ballasting situation, 73 percent of the input power could be identified. When the excitation rate is known, the value for the electron density can be obtained and this can be used to calculate a value for the resistance of the gas discharge. As may be seen from Table 1, the measured value of resistance is approximately only half the calculated value for the bare electrode case, while it is about three-fourths of the calculated value for the capacitive ballasting case.

TABLE 1

| | Bare Electrode | Capacitive Ballasting |
|---|---|---|
| Pressure | 21 torr | 55 torr |
| Input Power | 3.2 Kw | 3.5 Kw |
| Output Power | 110 w | 370 w |
| Overall Efficiency | 3.5% | 7.0% |
| Particle Efficiency | .016 photons/molecule | .023 photons/molecule or 150 lbs/M$_{joule}$ |
| Power density | 2.6 w/cm$^3$ | 8.9 w/cm$^3$ |
| Mirror flux | 440 w/cm$^2$ | 1500 W/cm$^2$ |
| Temp. at Exit | 520°K | 460°K |
| Power loss due to Flow | 770 w | 1100 w |
| Power loss due to Deactivation | 230 w | 980 w |
| Power loss due to lasing | 530 w | 1780 w |
| Total power loss | 1530 w | 3860 w |
| Percent of Input Power | 48% | 73% |
| Electron Density | 5.5 × 10$^{10}$cm$^{-3}$ | 7.7 × 10$^{10}$cm$^{-3}$ |
| Gas Resistance (measured) | 74Ω | ~230Ω |
| Gas Resistance (Calculated) | 160Ω | 300Ω |

The flow time in the active region for both cases shown in Table 1 is a fraction of a millisecond. This means that the flow time is short compared to either diffusion time for the neutrals to the walls, and the ambipolar diffusion time to the walls with a charged species. The walls have no influence on either the gas discharge or the thermodynamic properties of the laser. Accordingly, the laser is dominated by volumetric effects of the gas media.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

I claim:

1. In high powered apparatus for providing stimulated emission of radiation the combination comprising:
   a. gas supply means for producing a flow of a gaseous medium having a predetermined velocity and pressure;
   b. rectangular enclosure means defining a population inversion region having a longitudinal axis, said enclosure means receiving and exhausting said medium from said gas supply means in a direction orthogonal to said axis, said prismatic means having a top wall, a bottom wall, and side walls;
   c. first means for providing a spatially uniform radio frequency discharge in said medium to provide a population inversion in said medium in said population inversion region, said first means including first and second oppositely disposed electrode means carried by respectively said top and bottom walls and extending substantially the distance between said side walls, each said electrode means comprising a continuous metal member and a thin layer of non-conducting material disposed on and covering said metal member intermediate said metal member and said gaseous medium, said non-conducting material providing capacitive ballasting permitting the provision of population inversions at pressures up to four times greater than that possible when said metal members are exposed to said gaseous medium; and
   d. optical means aligned with said longitudinal axis and optically coupled to said population inversion region for stimulating the emission of radiation from said gaseous medium in said region.

2. The combiantion as defined in claim 1 wherein for said predetermined velocity up to Mach I, the volume of said rectangular enclosure means is so great as to maintain electron-ion pair diffusion to said walls at a level that is less than all other electron losses in said population inversion region.

3. The combination as defined in claim 1 wherein said metal members are rod shaped and extend substantially the length of and parallel to said longitudinal axis, said rod shaped metal members being oppositely disposed one to another and opposite sides of said longitudinal axis.

4. The combination as defined in claim 3 wherein said optical means comprises mirror means carried by said side walls for providing an optically resonant cavity.

* * * * *

PO-1050
(5/69)

UNITED STATES PATENT OFFICE
CERTIFICATE OF CORRECTION

Patent No. 3,748,594          Dated July 24, 1973

Inventor(s) Evan R. Pugh

It is certified that error appears in the above-identified patent and that said Letters Patent are hereby corrected as shown below:

Column 11, line 5, for "and" read --on--.

Signed and sealed this 23rd day of April 1974.

(SEAL)
Attest:

EDWARD M.FLETCHER,JR.　　　　　　　　　　C. MARSHALL DANN
Attesting Officer　　　　　　　　　　　　　Commissioner of Patents